United States Patent Office 3,195,685
Patented July 20, 1965

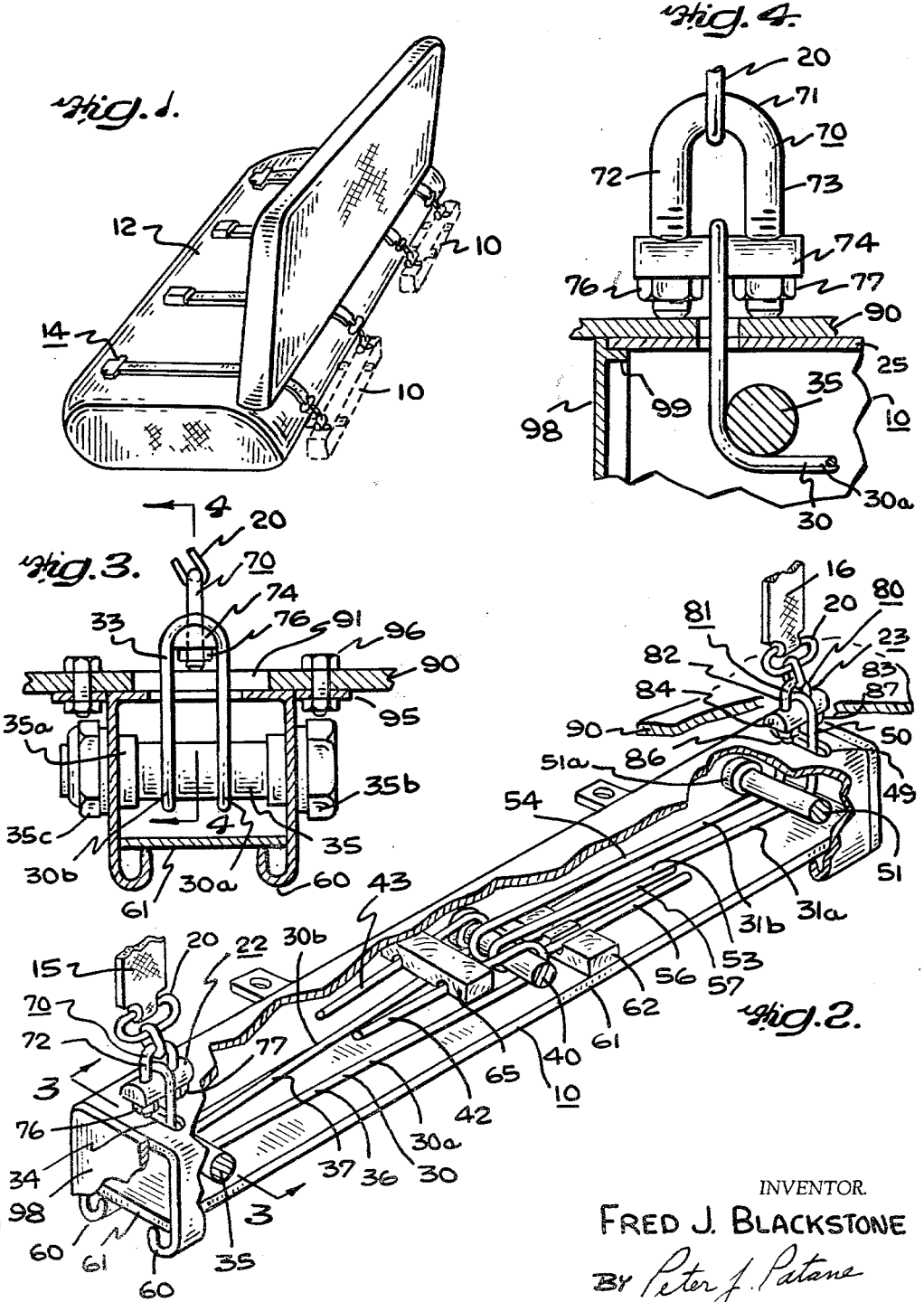

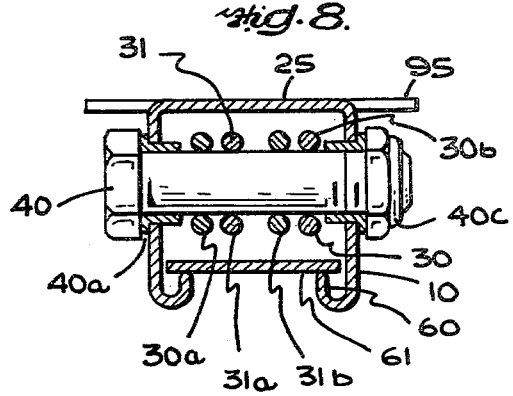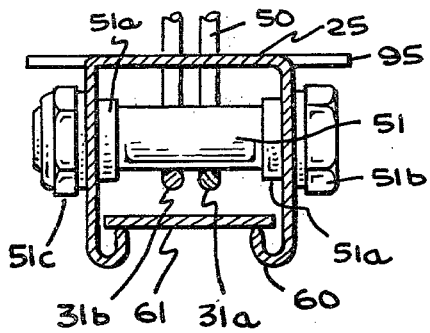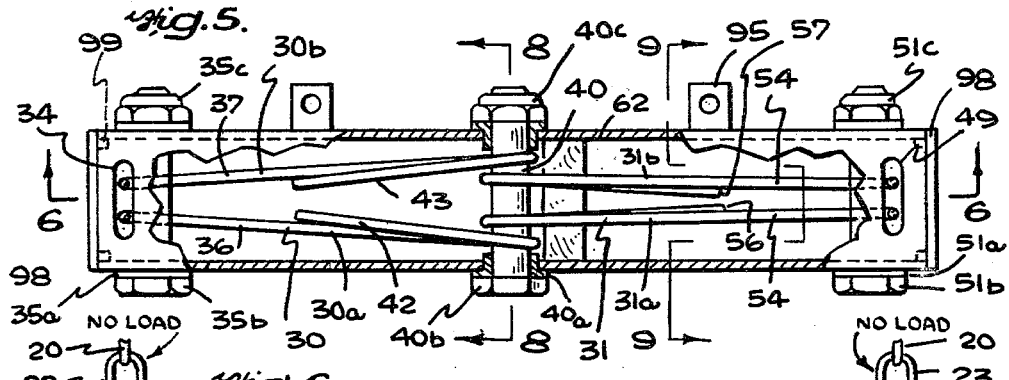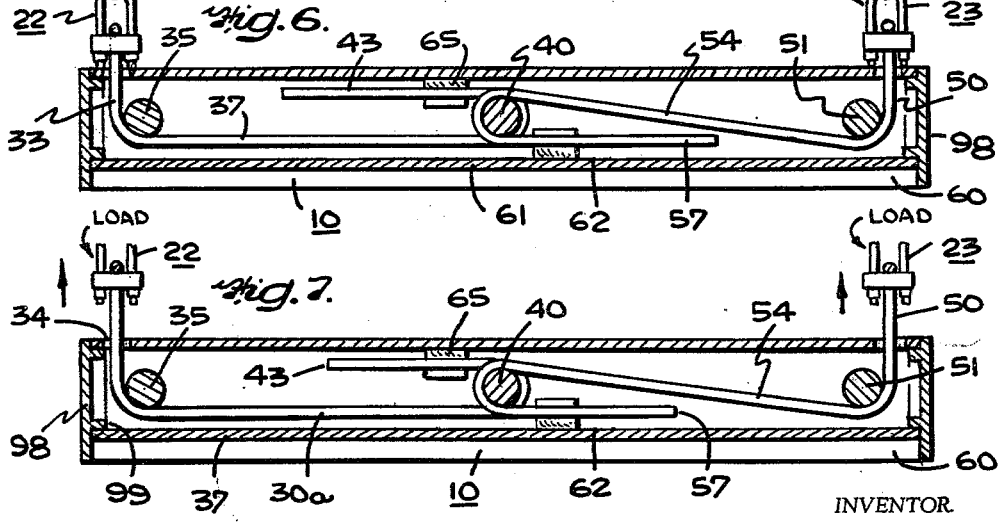

3,195,685
DEVICE AND METHOD FOR DECELERATING MOVING MASSES
Fred J. Blackstone, 25 Draper, Plattsburg, N.Y.
Filed June 13, 1963, Ser. No. 287,540
8 Claims. (Cl. 188—1)

This invention relates to an improved device and method for efficiently controlling and uniformly decelerating or braking a mass moving relative to second mass so that, for instance, should the masses impact the destructiveness of the impact on the first mass will be alleviated and, in particular, to an improved device for use with a passenger and his seat belt and a method for decelerating the passenger, upon the occurrence of an accident, by dissipating some of the kinetic energy of deceleration of the passenger in mechanical deformation of an element associated with the passenger's seat belt. It is a general object of this invention to provide an improved device for absorbing some or all of the kinetic energy of deceleration of a mass moving relative to a second mass, the former including a human body and the latter including the earth, an extraterrestrial mass, or a vehicle.

As is commonly known, automobile passenger seat belts, while known for many years, are coming into more widespread and more common use by the public as the public becomes educated to the great benefits which usually accrue to passengers properly wearing seat belts of good quality and construction at the time of an accident, such as when two automobiles collide. The function of a conventional automobile seat belt is to restrain the passenger (at the time of the accident which initiates the sudden and sharp deceleration of the automobile) from continuing to move forward as the automobile is slowing down or suddenly stopped. However, the restraint (on the passenger by the seat belt) takes place at what might almost be considered line contact between the seat belt and the passenger, since the usual seat belt is not very wide, and hence the resulting pressure on the abdomen of the passenger may, in certain accidents, be high enough to cause bruising of the passenger or more serious internal injuries.

Further, while restraint of the passenger by the seat belt is beneficial (to a certain extent) usually, the conventional seat belt does little to cushion or absorb the impact of the passenger against the seat belt which takes place upon sudden deceleration of the automobile, and if this impact is with a sufficiently high force, the seat belt may fail at the places where it is attached to the automobile, in the fabric of the belt, or in its fittings. It is still another object of this invention to minimize the possibility that the seat belt may fail by attaching the seat belt to an energy absorbing device which comes into action at a predetermined amount of force upon the seat belt due to the impact of the passenger against the seat belt.

Thus, briefly it is seen that the problem to which this invention is directed is that at the time of an accident, when the automobile decelerates rapidly to a stop, the passenger continues to move forward at a faster rate than the automobile and impacts against the seat belt, and even though further movement of the passenger is usually prevented by the conventional seat belt, the restraining force or pressure on the passenger may itself cause injury to the passenger. This invention provides a device attached to the automobile and to which the seat belt is attached having an element to which the passenger force on the seat belt may be applied and which will deform and thereby absorb some of the kinetic energy of deceleration of the passenger, but simultaneously allow the passenger to move forward slightly, so as to reduce the deleterious effect that the conventional seat belt restraining force may have on the passenger.

As is known, as the speed of a mass increases, the problem of greatly decelerating the mass in a short time period (or suddenly stopping) becomes more difficult in direct proportion to the square of the increase in velocity because, for instance, doubling the velocity quadruples the kinetic energy of the mass to be absorbed when the mass is brought to a stop. Since the kinetic energy of a mass is directly related to the force exerted by the mass at impact with a second mass, it is seen that the faster the speed the greater is the destructive force on the first mass upon a sudden deceleration. This invention makes provision for the increase in kinetic energy at the higher velocities by providing a device which will have a capacity to absorb a predetermined amount of kinetic energy.

Of course, no safety appliance can insure against the serious injury or death of a passenger in an accident but it is a general object of this invention to further minimize the risk of injury to the passenger by providing a device specifically constructed to absorb (rather than, as do the conventional seat belts, merely substantially resist) the impact of the passenger against the seat belt.

In one embodiment of my invention the two straps which form the present conventional seat belt are operatively connected to steel wires and the decelerating force of the passenger is applied uniformly by the straps to the wires. One strap is operatively connected to one wire and the other strap is operatively connected to another wire and all the wires have portions intermediate their ends which extend tangentially from the shaft, one wire extending in one direction and the other wire extending in the opposite direction.

Upon the occurrence of an accident and the impact of the passenger against the seat belt straps, a force is exerted by the passenger on the straps, and the straps in turn exert tension forces on the wires tending to pull one wire away from the other wire by deforming or bending them about the shaft, and if this force is above a predetermined amount a deformation of the wires results which absorbs the energy of deceleration and permits the passenger to move forward slightly.

Further objects of this invention are to provide an improved device and method for efficiently and uniformly decelerating or braking moving masses which is economical in cost, of relatively light weight and space requirements, and of reduced complexity relative to some other devices and other methods.

The foregoing and other objects of this invention, the principles of this invention, and the best mode in which I have contemplated applying such principles will more fully appear from the following description and accompanying drawings in illustration thereof.

In the drawings,

FIG. 1 is a perspective view illustrating this invention as associated with an automobile seat for two passengers and thus requiring two of the devices incorporating this invention;

FIG. 2 is a perspective view of the device illustrated in FIG. 1 and incorporating this invention, the housing thereof being broken away to illustrate certain internal structure;

FIG. 3 is a view, mostly in section, taken along the line 3—3 in FIG. 2;

FIG. 4 is a partial view taken along the line 4—4 in FIG. 3;

FIG. 5 is a top view of the device, the housing being broken away to show the internal arrangement;

FIG. 6 is a longitudinal view taken along the line 6—6 in FIG. 5 illustrating the internal parts mostly in side elevation;

FIG. 7 is a view similar to FIG. 6 but after a sufficient force has been imposed upon the device to actuate certain of its internal parts;

FIG. 8 is a view, mostly in section, taken along the line 8—8 in FIG. 5; and

FIG. 9 is a view, mostly in section, taken along the line 9—9 in FIG. 5.

Referring to the drawings, this invention is illustrated in FIG. 1 for use in an automobile and is illustrated as comprising a device or unit 10 one of which is provided for each of the two passengers to be accommodated in the automobile seat 12, the devices 10 being illustrated in FIG. 1 in dot-dash lines, as they are normally not viewable in the passenger compartment. Two seat belts 14, one for each passenger, are provided, each seat belt 14 comprising two straps 15 and 16 and connectable at their left hand ends, as viewed in FIG. 1, by a suitable buckle. The description hereinafter, for brevity, will be in terms of one seat belt 14 and one device 10, it being understood that the others are similarly constructed.

The lower or right hand ends of the straps 15 and 16 include chain links 20, the uppermost ones of which are suitably secured to the straps and the lowest ones of which are connected to attachment fittings 22 and 23, whereby the straps 15 and 16 are operatively connected to the device 10.

The device 10 includes an elongated housing 25, having a U-shape in cross-section as illustrated in FIG. 2, the housing 25 enclosing wires 30 and 31. As best illustrated in FIG. 2, the left hand wires 30 and 31. As illustrated in FIG. 2, the left hand wire 30 comprises two, integral segments 30a and 30b which are bent, at the wire midportion, to form an inverted vertical U-shaped portion 33 extending through a suitable slot 34 in the top wall of the housing 25, the U-shaped portion 33 being attached to the fitting 22. As illustrated in FIGS. 2 and 6, the two legs of the U-shaped wire portion 33 extend downwardly and the wire segments 30a and 30b are then both bent approximately 90°, to the right, about an end shaft 35, extending under and tangentially to the surface of the shaft to form two intermediate horizontal portions 36 and 37, between the end shaft 35 and a central abutment or shaft 40. At the central shaft 40 the wire segments 30a and 30b are further bent, from under the shaft 40, around the shaft 40 for about 180° only and extend, at the top of the shaft 40, tangentially toward the left, i.e., toward the end shaft 35, thus defining free end portions 42 and 43 which are generally parallel with, and on the same side of the shaft 40 as the intermediate wire portions 36 and 37, and intermediate the shafts 35 and 40.

The wire 31 is formed similar to the wire 30, the wire 31 being formed by two integral segments 31a and 31b which come together, at the wire midportion, to form an inverted vertical U-shaped portion 50 extending through a suitable slot 49 in the upper wall of the housing 25, the U-shaped portion 50, however, being attached to the fitting 23.

As also illustrated in FIGS. 2 and 6, the two legs of the U-shaped wire portion 50 extend downwardly and the wire segments 31a and 31b are then both bent between 90° and 180°, to the left about an end shaft 51, extending under and tangentially to the surface of the shaft 51 to form two intermediate portions 53 and 54, intermediate the end shaft 51 and the central shaft 40, the bending of the wire being sufficient to take it tangentially from the underside of shaft 51 to the topside of shaft 40. At the central shaft 40 the wire segments 31a and 31b are placed between the wire segments 30a and 30b and further bent, from above the shaft 40, around the shaft 40 for about 180° only and extend at the bottom of the shaft 40, tangentially toward the right, i.e., toward the end shaft 51, thus defining horizontal free end portions 56 and 57 which are on the same side of the shaft 51 as the intermediate wire portions 53 and 54 but at an angle thereto and intermediate the shafts 40 and 51, the disposition of the intermediate portions 53 and 54 and the free end portions 56 and 57 being generally horizontal, however, relative to the U-shaped portion 50.

The housing 25 has side walls defining upwardly curved end portions 60 upon which rests a bottom plate 61, the plate 61 fitting snugly between the side walls. Also fitted snugly between the side walls, so as to be retained thereby, is a guide block 62 having two grooves, one for the free end portion 56 and the other for the free end portion 57, the guide block 62 resting upon the plate 61 and just to the right of the central shaft 40, the guide block 62 aligning the free end portions 56 and 57 horizontally and tangentially with the shaft 40 to restrain the tendency of the end portions 56 and 57 to rotate clockwise and move downwardly away from the shaft 40, i.e., to prevent the end portions 56 and 57 from following a longer and easier path on a slant about the longitudinal axis of the shaft 40. Similarly, a guide block 65 with grooves for the free end portions 42 and 43 is also provided to the right of the shaft 40, above the free end portions 42 and 43, the guide block 65 fitting snugly between the side walls of the housing 25 and against the top of the U-shaped housing 25, FIG. 6.

The attachment fitting 22, FIG. 4, comprises a U-shaped yoke 70 having a base 71 and legs 72 and 73, the legs being threaded throughout most of their length. A half-moon bar 74 straddles the legs 72 and 73 and is provided with suitable holes through which the legs slidably extend. Below the half-moon bar are threaded two nuts 76 and 77 one on each side of the legs.

Similarly, the attachment fitting 23 comprises a U-shaped yoke 80 having a base 81 and legs 82 and 83, the legs being threaded throughout most of their length. A half-moon bar 84 straddles the legs 82 and 83 and is provided with suitable holes through which the legs slidably extend. Below the half-moon bar are threaded two nuts 86 and 87, one on each of the legs.

Referring to FIGS. 2, 3 and 4, and, for instance, attachment fitting 22, it is seen that the base of the U-shaped wire portion 33 interfits with and loops about the upper or convex surface of the half-moon bar 74 and the connection between the attachment fitting 22 and the wire 30 is secured by the nuts 76 and 77 which are tightened up against the flat underside of the bar 74. The attachment fitting 23 is in like manner secured to the wire 31.

When it is desired to install the device 10 to an automobile, the steel floor board 90 is provided with suitable openings 91 aligned with the slots 34 and 49 in the top wall of the housing 25. The attachmen fittings 22 and 23 are removed from the device 10 and the housing 25 placed under the floor board 90, the U-shaped portions 33 and 50 extending through the openings 91 in the floor board 90. The attachment fittings 22 and 23 are then placed above the floor board 90 (in the passenger compartment) and connected to the U-shaped wire portions 33 and 50, respectively. In so doing, as the nuts 76, 77, 86 and 87 are tightened the legs 72, 73, 82 and 83 move downwardly until they engage the floor board 90 at which time continued tightening of the nuts moves up the half moon bars 74 which pulls up on the wires 30 and 31, i.e., as the nuts 76 and 77 are tightened a tension force is placed on the wire 31 about the shafts 40 and 35, this force urging the portions of the wire 30 which are about the shafts 35 and 40 into contact therewith. Likewise, as the nuts 86 and 87 are tightened a tension force is placed on the wire 31 tending to pull the wire about the shafts 40 and 51, this force also urging the portions of the wire 31 which are about the shafts 40 and 51 into contact therewith. When the nuts have been tightened sufficiently so that the wires 30 and 31 are taut about their shafts, the chain links 20 of the seat belt straps 14 and 15 are connected to the yokes 70 and 80, respectively, as illustrated.

If desired, brackets 95 may be secured to the outside walls of the housing and bolts 96 (extending through suitable holes) used to secure the bracks 95 to the floor board 90.

Further, the housing 25 may be provided with end caps 98 to close the ends thereof, the caps 98 having legs 99 frictionally engaging the side walls of the housing to retain the caps.

The end shafts 35 and 51 are of substantially the same diameter as the central shaft 40 and all three are horizontally aligned. The three shafts 35, 40 and 51 are carried in suitable bearings 35a and 40a and 51a pressed into and frictionally retained in suitable holes in the opposed side walls of the housing 25. The shafts 35, 40 and 51 are formed wtih ends 35b, 40b and 51b, respectively, and the opposite ends are threaded to each receive lock nuts 35c, 40c and 51C for properly retaining them against lengthwise movement.

The shafts 35, 40 and 51 are loosely fitted and freely rotatable in their bearings so that kinetic energy absorbtion is due substantially entirely to the deformation of the wires rather than to any sliding friction of the wires about the shafts. The advantage of the foregoing is that the variable friction effect is substantially eliminated, as is also the possibility of binding or seizing between the wires and the shafts, the latter being undesirable because it would tend to cause loads on the wires which might be sufficient to break the wires, whereas by the use of the wire deformation, as taught by this invention, to absorb the kinetic energy, the load on the wires is the same at any impact speed of the vehicle.

Further, I prefer to form the shafts 35, 40 and 51 of solid material but it is seen that they could be hollow as long as they are stiff enough and have sufficient surface hardness as to substantially not deform nor impair movement of the wires when a load is applied to the wires sufficient to pull the wires about the shafts. Also, the surface hardness of the shafts could be greater than that of the wires. Preferably the wires 30 and 31 are of steel and have small diameters relative to the shafts 35, 40 and 51.

Further, it is contemplated that fixed shafts (not illustrated) and freely rotating sleeves mounted about the shafts on or with anti-friction means could also be used in place of the shafts 35, 40 and 51, thereby reducing the inertia of the masses about which the wires are deformed from that of the shafts to the lower inertia of the sleeves, an advantage at exceptionaly high impact speeds.

The guide blocks 62 and 65 are preferably made of wood but it is seen that other suitable materials could be used.

Also, as illustrated, the wires 30 and 31 are spaced from each other along the length of the shaft 40 and are positioned relative to the housing 25, plate 61 and end caps 98 so as to be spaced therefrom, to insure free movement of the wires, the guide blocks 62 and 65 facilitating this positioning of the wires 30 and 31.

Referring particularly to FIGS. 2 and 5 it is further noted that the portions of the wire 30 extending between the shafts 35 and 40 and the portions of the wire 31 extending between the shafts 40 and 51 have their longitudinal axis extending at a right angle to that of the shafts 35, 40 and 51.

Thus, when the seat belt 14 is fastened about the passenger and the device 10 is attached to the automobile, as heretofore described, upon the happening of a collision for instance, and the consequent sudden deceleration of the passenger and the automobile, first and second masses, respectively, when the passenger impacts upon the seat belt 14, the force of impact is immediately transferred by the straps 15 and 16 to the wires 30 and 31.

If the force of impact of the passenger upon the seat belt is below a predetermined amount, the seat belt will restrain the passenger in the conventional manner and the device 10 will not come into operation at all.

Assuming that the force of impact of the passenger upon the seat belt is above the predetermined amount, for example, above 75% of the rated maximum load which the seat belt, including the chain links and the connection therebetween, will withstand without failing, the device 10 will then come into operation to absorb or cushion the force of impact. That is, the force of impact above 75% of the rated maximum load of the seat belt will exert a pull on the wires 30 and 31 sufficient to move the wires.

Assuming that the straps, including the chain links and the connection therebetween have a strength such that they will not fail if a tension force of 5000 pounds or less is applied to the seat belt (or 2500 pounds per strap), the various parts of the device 10 may be proportioned and the wires made of a material and stiffness such as to come into operation only when 75% or more of this 5000 pounds tension force or 3750 pounds, is applied to the seat belt. That, is below a deceleration where the passenger exerts a force of 3750 pounds or less against the seat belt, the device 10 does not come into operation and the seat belt restrains the passenger in the conventional manner.

If, upon a collision, the passenger impacts against the seat belt with a force in excess of 3750 pounds, for instance 4000 pounds, this force will be evenly divided between the two straps, each taking 2000 pounds. The 2000 pound force of each strap is in turn transmitted to the wires 30 and 31, each of the segments 30a, 30b, 31a and 31b taking 1000 pounds, the U-shaped portions 33 and 50 moving up to the positions illustrated in FIG. 7 and becoming longer, the extent of movement being proportional to the force. Of course, during such movement the free end portions move toward the central shaft from opposite sides thereof.

The 1000 pound forces on the wires simultaneously pull the wire segments 30a, 30b, 31a and 31b about the central shaft 40 first deforming them and then substantially straightening them as they leave the shaft 40.

Similarly, the portions of the wire segments 30a and 30b which move about the end shaft 35 are first bent thereabout and then substantially straightened.

The wire segments 30a and 30b leave the shaft 40 tangentially and at the bottom thereof in one direction whereas the wire segments 31a and 31b leave the shaft 40 tangentially also, but at the top thereof and in the opposite direction, thus the forces on the shaft 40 are counterbalanced by, in effect, pulling the wires off the shaft 40 from opposite sides.

Also, as the various wire portions pass over the shafts 35, 40 and 51, a slight permanent flattening of the wire also takes place, which also contributes to the energy absorption.

Thus, due to the movement of the wires 30 and 31, the passenger is permitted to move forward slightly also.

It is contemplated that arbitrary maximum amounts of movement of the wires 30 and 31 will be established after which it will be recommended that the device be returned to the factory for substitution of replacement wires. These limits can be designated by painting red stripes on the wire at a distance spaced from the top surface of the floor board by the predetermined amount of maximum movement and suggesting that when this red strip appears above the floor board, that the device be returned.

Thus, it is seen that the kinetic energy above a force of 3750 is absorbed or dissipated in deforming the wires about the shafts. The greater the force is above 3750 pounds, the greater the movement upward of the attachment fittings 22 and 23, i.e., the greater the linear distance that the wires will be drawn around the shafts.

It is further seen that the deceleration of the passenger takes place smoothly as the wires are pulled about the shafts and the device can be modified to vary the initial impact force that will bring the device into operation so that, if desired, a low impact force could initiate movement of the wires. Further, the force of deceleration that is the force on the passenger restraining his movement or the pressure of the seat belt against him, is constant in this device during the deceleration. That is, whether the impact occurs at an automobile speed of 50 miles per hour or 100 miles per hour, the force of deceleration on the passenger is the same, but (of course) more wire would be pulled past the shafts at the higher speed.

It is seen that the force of deceleration on the passenger depends primarily on three factors, that is, firstly, the stiffness (temper) of the wire, secondly, the diameter (or cross-sectional mass) of the wire and, thirdly, the diameter of the central shaft 40. Secondary factors which also influence the force of deceleration on the passenger are, fourthly, the diameters of the end shafts 35 and 51, and, fifthly, the number of times the wires are bent about the shafts (since they could be wrapped about the shafts so as to complete a full turn around the shaft before being pulled off the shafts). Tests that have been made to date indicate that 180° turn about the central shaft, which is illustrated in the drawings, develop substantially the maximum retardation force of a particular wire and that a complete turn about the central shaft or several complete turns thereabout do not substantially increase the retardation force.

In summary, it is seen that the kinetic energy of the body which is decelerating is applied to stiff, deformable wires 30 and 31. The wires 30 and 31 are preferably of one piece construction, not stranded, and have substantially no resilience. The wires are permanently deformed in sliding or passing along the shafts and then substantially restraightened, the wire being constrained to a predetermined path during such deformation and restraightening. Normaly the wires and the shafts move along with substantially the same velocity as the passenger and, in a sense, are carried by the passenger. When the automobile suddenly stops, the shafts stop or are arrested also and become, in a sense, fixed to the automobile in that they also are arrested or stopped suddenly but the passenger and the wires continue to move forward, thereby absorbing the passenger's kinetic energy of deceleration in deforming the wires about the shafts, all as heretofore described.

Also, it is seen that the wires 30 and 31 could take other shapes and, for instance, could be formed as hollow tubes (not illustrated). The advantage of a hollow tube is that kinetic energy would be absorbed by crushing of the tube as well as by bending thereof. The absorption of the kinetic energy by crushing could also be increased by filling the tube with a suitable, crushable plastic material.

Having described the invention, I claim:

1. A device attachable by two straps to opposite sides of a deceleratable mass, said device comprising a housing, bearings carried by said housing, a central shaft and two end shafts, said shafts being freely rotatable in said bearings, two elongated U-shaped wires which are stiff but deformable, two attachment fittings for connecting one of said straps to one of said wires at the base of the U-shape of said wires, said wires having intermediate portions bent about said central shaft, one of said wires being guided by one end shaft, the other of said wires being guided by the other end shaft, guide means constraining said intermediate portions of said wires about said central shaft, the free end portion and the portion of each wire connected to the attachment fitting being on the same side of said central shaft, whereby when the decelerating mass imposes forces on said wires, the forces on said central shaft are in opposite directions, tending to rotate the central shaft in the same direction so as to minimize binding of the wires on the central shaft.

2. A device for absorbing the kinetic energy during deceleration of a vehicle passenger and attachable to a passenger seat belt formed by two straps, said device comprising a housing, a central shaft and two end shafts, two elongated wires which are stiff but deformable, bearings for said shafts carried by said housing, said shafts being freely rotatable in said bearings, two attachment fittings for connecting one of said straps to one of said wires at first portions of said wires, said wires having intermediate portions bent about said central shaft, one of said wires being guided by one end shaft, the other of said wires being guided by the other end shaft, means adjacent said central shaft for constrainably guiding said wires about said central shaft, the free end portion of the portion of each wire connected to the attachment fitting being on the same side of said central shaft, whereby when the seat belt imposes forces on said wires, the forces on said central shaft are in opposite directions, tending to rotate the central shaft in the same direction.

3. A device for absorbing the kinetic energy during deceleration of a vehicle passenger and attachable to a passenger seat belt formed by two straps, said device comprising a housing, a central shaft and two end shafts, two elongated U-shaped wires which are stiff but deformable, bearings for said shafts carried by said housing, said shafts being freely rotatable in said bearings, two attachment fittings for connecting one of said straps to one of said wires at first portions of said wires, said wires having intermediate portions bent about said central shaft substantially 180°, one of said wires being bent substantially 90° about and guided by one shaft, the other of said wires being bent substantially 90° about and guided by the other end shaft, means adjacent said central shaft for constrainably guiding said wires around said central shaft, the free end portion and the portion of each wire connected to the attachment fitting being on the same side of said central shaft, whereby when the seat belt imposes forces on said wires, the forces on said central shaft are in opposite directions, tending to rotate the central shaft in the same direction.

4. A device attachable by two straps to opposite sides of a deceleratable mass, said device comprising an abutment, two separate permanently deformable members having portions disposed so as to pass around and in contact with said abutment when said members are pulled with sufficient forces by said straps on deceleration, said members extending from said abutment in opposite directions and attachable to the straps, the deceleration of said mass placing substantially balanced forces on said members tending to pull said members about said abutment in opposite directions substantially simultaneously to deform said members about said abutment as said members are pulled by said forces around said abutment when said forces are above predetermined amounts.

5. A device attachable to a two strap passenger seat belt, said device comprising an abutment, two separate long and permanently deformable U-shaped wires having portions remote from the base of the U-shape passing around and in contact with said abutment in opposite directions, said wires extending from said abutment in opposite directions and attachable one to each of the two straps of the seat belt at the base of the U-shape, the impact of said passenger upon said seat belt placing substantially balanced forces on said wires tending to pull said wires about said abutment in opposite directions substantially simultaneously to deform said wires about said abutment as said wires are pulled by said forces.

6. A device attachable to a two strap passenger seat belt, said device comprising a housing, bearings carried by said housing, a central abutment supported by said bearings within said housing, two long and permanently deformable U-shaped wires having portions remote from the base of the U-shape passing 180° around and in contact with said abutment, said wires extending tangentialy to and from said abutment in opposite directions, end abutments on opposite sides of said central abutment for guiding and bending end portions of said wires toward the passenger, the end portions of said wires being also attachable one to each of the two straps of the seat belt, the impact of said passenger upon said seat belt placing balanced forces on said wires tending to pull said wires simultaneously about said central abutment in opposite directions to first deform and then substantially straighten said wires about said central abutment as said wires are pulled by said forces.

7. A device for absorbing the kinetic energy during deceleration of a first mass which is decelerating relative to a second mass, said device comprising a shaft, two stiff but bendable wires generally extending in opposite directions relative to the longitudinal axis of said shaft and having portions bent about said shaft and other portions bendable about said shaft, said shaft and wires being operatively related to said masses such that as between said shaft and said wires, one is fixable relative to one of the masses at the start of said deceleration and the other is movable with the decelerating mass and relative to the one that becomes fixed during said deceleration, whereby two substantially counterbalanced forces of deceleration are imposed by said wires on said shaft as they bend about said shaft until the kinetic energy of deceleration is absorbed.

8. A device associated with two moving masses for absorbing the kinetic energy during deceleration of the first mass upon deceleration relative to the second mass, said device comprising a central shaft, two stiff but bendable wires generally extending in opposite directions but in substantially the same planes and having portions bent substantially 180° about said central shaft and other constrained end portions bendable about said central shaft, two guide shafts one on opposite sides of said central shaft, the ends of said wires attached to said first mass being bent about said guide shafts and toward said first mass, said wires being movable with the first or decelerating mass whereby two counterbalanced forces of deceleration are imposed by said wires on said shaft as they bend about said central shaft until the kinetic energy of deceleration of said first mass is absorbed.

References Cited by the Examiner
UNITED STATES PATENTS

| | | | |
|---|---|---|---|
| 1,451,493 | 4/23 | Cruickshank. | |
| 2,578,753 | 12/51 | Smith | 188—1 X |
| 2,578,903 | 12/51 | Smith | 188—1 |
| 2,682,931 | 7/54 | Young | 188—1 |
| 3,074,760 | 1/63 | Hodgekin | 297—386 |
| 3,087,584 | 4/63 | Jackson | 188—1 |
| 3,089,564 | 5/63 | Smittle | 188—1 |
| 3,089,669 | 5/63 | Broudo | 188—101 X |

ARTHUR L. LA POINT, *Primary Examiner.*

DUANE A. REGER, *Examiner.*